United States Patent [19]

Müller et al.

[11] Patent Number: 4,622,000

[45] Date of Patent: Nov. 11, 1986

[54] APPARATUS FOR PRODUCING PROPELLANT CHARGE POWDER IN THE FORM OF STRANDS

[75] Inventors: Dietmar Müller, Karlsruhe; Rudolf Kröhnert, Ettlingen; Harald Franken, Karlsruhe, all of Fed. Rep. of Germany

[73] Assignee: Fraunhofer-Gesellschaft zur Forderung der angewandten Forschung e., Fed. Rep. of Germany

[21] Appl. No.: 705,689

[22] Filed: Feb. 26, 1985

[30] Foreign Application Priority Data

Feb. 28, 1984 [DE] Fed. Rep. of Germany ..... 34072381

[51] Int. Cl.[4] .............................................. A23G 3/00

[52] U.S. Cl. .................................... 425/467; 425/468; 264/3.2; 264/173; 264/177 R; 264/177.1

[58] Field of Search ............... 264/177 R, 177 F, 171, 264/173, 3 R, 3 A, 3 B, 3 C, 3.2; 425/466–468

[56] References Cited

U.S. PATENT DOCUMENTS

| | | | |
|---|---|---|---|
| 321,374 | 6/1885 | Lyman | 102/289 X |
| 2,320,243 | 5/1943 | Mackey | 264/3 B |
| 2,342,204 | 2/1944 | Mackey | 264/3 B |
| 3,035,950 | 5/1962 | Long | 102/289 X |
| 3,090,196 | 5/1963 | Brewer | 102/289 X |
| 3,574,800 | 4/1971 | Pierce | 264/3 B |
| 3,761,330 | 9/1973 | Lou et al. | 264/3 C X |
| 4,474,715 | 10/1984 | Weber et al. | 264/3 C X |

*Primary Examiner*—Peter A. Nelson

*Attorney, Agent, or Firm*—McCormick, Paulding & Huber

[57] ABSTRACT

For the continuous or discontinuous production of propellant charge powder in strand form with axially parallel channels having a clearly defined identical diameter and reproducible geometry of the channel arrangement, a press is provided, which has at least one cavity, and which is provided in its strand-forming area with a plurality of needles for shaping the channels, said needles being constructed as open hollow needles and are subject to the action of a fluid with a limited overpressure.

7 Claims, 3 Drawing Figures

APPARATUS FOR PRODUCING PROPELLANT CHARGE POWDER IN THE FORM OF STRANDS

BACKGROUND OF THE INVENTION

The invention relates to an apparatus for producing propellant charge powder in the form of strands with axially parallel channels in a press with at least one cavity which, in its strand-forming area, has a plurality of needles for shaping the channels.

Strand-like propellant charge powder is discontinuously produced in pot presses, whose base can contain a plurality of cavities. This leads to several short cylindrical members made from propellant charge powder. Increasing importance is being attached to the continuous production of strands, which can be cut to any desired length. These are produced by means of twin-shaft screw extruders, rotating in the same or opposite directions (DE-OS No. 30 44 577), having in alternating arrangement screw-like conveying segments and steadying zones in a clearly defined arrangement.

A reduced internal diameter mould head is arranged at the extruder outlet side and forms the plasticized propellant charge powder into a strand. The mould head also carries needles which project into the bore of the shaping part and form the channels in the strand.

In order to ensure completely satisfactory burn-up and ballistics, it is necessary on the one hand for the diameter of the individual channels to be closely toleranced and on the other for their arrangement within the strand to be absolutely symmetrical, i.e, the reciprocal spacing of the channels, as well as the spacing between each channel and the centre and from the outer periphery of the strand must be absolutely identical. In connection with presses of all types, it has been found that these requirements concerning the geometry of the channels can frequently not be satisfied. Thus, channel diameter fluctuations occur, which necessarily lead to errors in the overall geometry.

SUMMARY OF THE INVENTION

The problem of the present invention is to provide an apparatus enabling the continuous or discontinuous production of a propellant charge strand with clearly defined, reproducible geometry of the channels.

On the basis of the aforementioned apparatus this problem is solved in that the needles are constructed as hollow needles and subject to the action of a fluid with a limited overpressure.

During the extrusion of the strand, the fluid which is under a slight overpressure continuously flows through the open hollow needles. At the open ends of the hollow needles, the fluid penetrates the channels shaped from the outside by said needles, so that the channels are also under a slight overpressure. At the front end of the propellant charge stand, where its plasticity is largely lost, the fluid passes into the environment. Practical tests carried out on pot presses and extruders have shown that this measure makes it possible to produce channels with an absolutely identical diameter, so that neither the individual channel, nor the overall geometry of the channel arrangement is disturbed. This action can probably be explained by the fact that the hitherto observed deformations are due to residual stresses, which are imparted to the strand during extrusion. The flow behaviour of the strand in the mould head must also not be assumed as absolutely symmetrical, so that locally differing shear forces act on the strand periphery. These, admittedly small residual stresses which, on after stress removal and when the strand is discharged, lead to the deformations, are clearly compensated by the low overpressure in the channels, so that as the consistency of the strand becomes increasingly harder, the residual stresses are "frozen".

Known apparatuses in the form of an extruder have a mould head with a perforated plate terminating the extruder chamber on the outlet side, said perforated plate having a plurality of passage holes arranged symmetrically around a circle, as well as a centrally positioned needle holder, whose needles project into a downstream mould part with a reduced internal diameter compared with the arrangement circle of the holes. The plasticized propellant charge powder is consequently firstly forced through the holes of the perforated plate by the extruder shafts. The resulting individual smaller diameter strands are then combined to form a larger strand in the reduced internal diameter mould part. In the case of such a construction of the apparatus, the needle holder and the perforated plate preferably have at least one radially directed channel for supplying the fluid to the hollow needles.

However, preferably a fluid channel is arranged in each case between adjacent holes of the perforated plate, so that the fluid flows symmetrically to the hollow needles and different flow resistances and paths are avoided, or conversely it is ensured that the fluid flows out at each hollow needle at the same speed and with the same pressure.

Advantageously, the needle holder is interchangeably mounted in a receptacle for the perforated plate, so that the number and arrangement of the channels can be selected by replacing the needle holder, with the fluid supply being the same in each case.

To keep the residual stresses imparted to the strand as small as possible, the invention provides for the minimization of interfacial forces between the mould part and the strand. This can be brought about in that mould part is made from brass, high-grade steel or a steel with a high TiC proportion in spherulitic form. Such a mould part can e.g. be produced by electroerosion so that surface unevennesses by mechanical working are avoided. The aforementioned materials have a surface with a very limited roughness, or a spherical roughness in the micro-range. In place of these materials, it is also possible to use inserts made from plastics, e.g. PTFE.

The fluid can either be air, or inert gas, which is e.g. under a pressure of approximately 1.5 bar.

BRIEF DESCRIPTION OF THE DRAWINGS

The invention is described in greater detail hereinafter relative to a non-limitative embodiment and the attached drawings, wherein show.

DETAILED DESCRIPTION OF THE INVENTION

Figure 1:
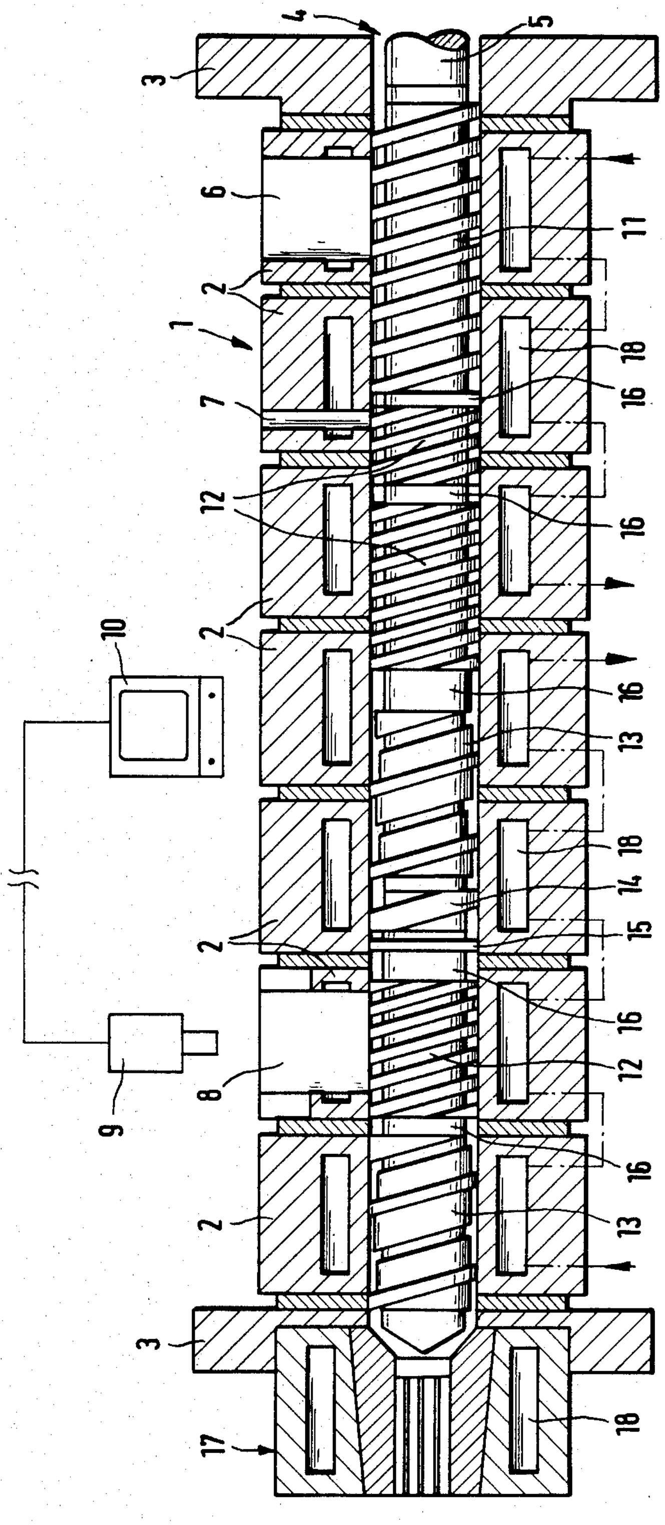
FIG. 1 is a diagrammatic longitudinal section through a twin-shaft screw extruder for continuous operation.

The extruder shown in FIG. 1 has a casing 1, which comprises a plurality of segments 2, which are braced together by end flanges 3. At drive side 4, two parallel screw shafts 5 running in the same or opposite directions are introduced into the casing and extend up to the front end flange 3, where they end in points. FIG. 1 merely shows one of the two screw shafts. A mould head 17 is connected to the final casing segment 2. Such a screw extruder e.g. makes it possible to produce monobasic or polybasic propellant charge powders, as described in the earlier-dated German Patent Application No. 32 42 301, so that reference is only made here to the essential parts of the extruder.

The first drive-side casing segment 2 is provided with a supply opening 6 for the solids components, namely nitrocellulose (NC) and adjuvants. The downstream-following, next segment 2 is equipped with a die channel 7, through which the solvent is fed in. The penultimate casing segment 2 in the feed direction has a recess 8, which is on the one hand used for venting the plasticized product and on the other is used for the photooptical recording of the surface of the plasticizer at this point. For this purpose, a camera 9 directed into opening 8 is provided, said camera being connected to a monitor 10. By means of the photooptical recording, the solvent is dosed in via channel 7, cf. DE-OS No. 30 44 577.

The two symmetrical screw shafts 5 have on the drive side a single thread conveying segment 11. In the vicinity of the die channel 7, this is followed by a further multiple thread conveying segment 12, which is followed by a first kneading segment 13 and a second kneading segment 14. The latter is followed by a baffle plate 15, which is in turn followed by a multiple thread conveying segment 12. Finally, further kneading segments 13 are provided at the outlet-side end of the shaft.

Between the individual conveying segments 12, as well as between the latter and the kneading segments 13, together with the baffle plate 15, there are steadying zones 16 where there are no displacement members on the shafts. The individual casing segments, as well as the mould heads 17 are provided with heating and/or cooling means 18, in order to be able to varyingly control the temperature of the plasticized product in the individual kneading and conveying areas.

The mould head 17 is located in a casing segment 19 (FIGS. 2 and 3), which is connected to the final casing segment 2 of the extruder. In the conveying direction, it initially has a perforated plate 20 with a plurality of axially parallel holes 21, which are arranged on a circle in spaced manner from the axis. The plasticized propellant charge powder is forced through these holes. With perforated plate 20 is linked a mould part 22 having a reduced internal diameter which gives the strand its final shape and final external diameter. A plurality of needles 23 extends into the bore of mould part 22, said needles being arranged in accordance with precisely defined geometry. The needles 23 are placed on a needle holder 24, which is axially and interchangeably inserted in perforated plate 20 and are constructed as hollow needles which are open at both sides.

Figure 3:
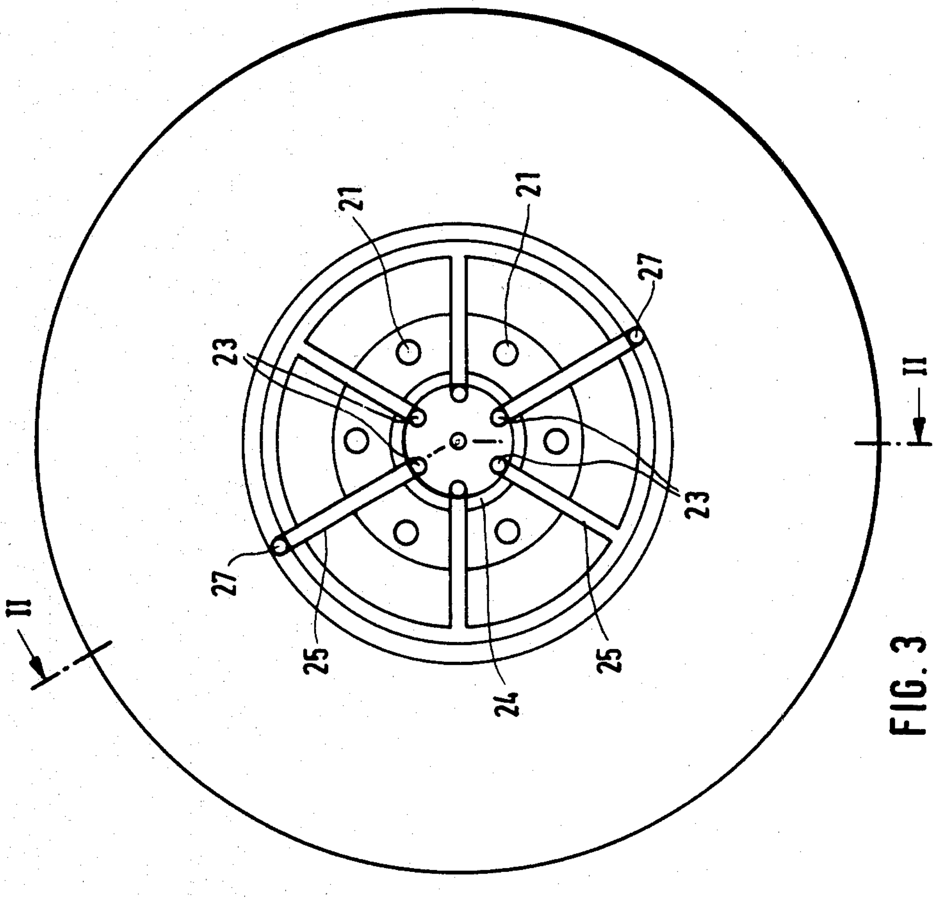
FIG. 3 a section according to III—III in FIG. 2 with a portion broken away.
Figure 2:
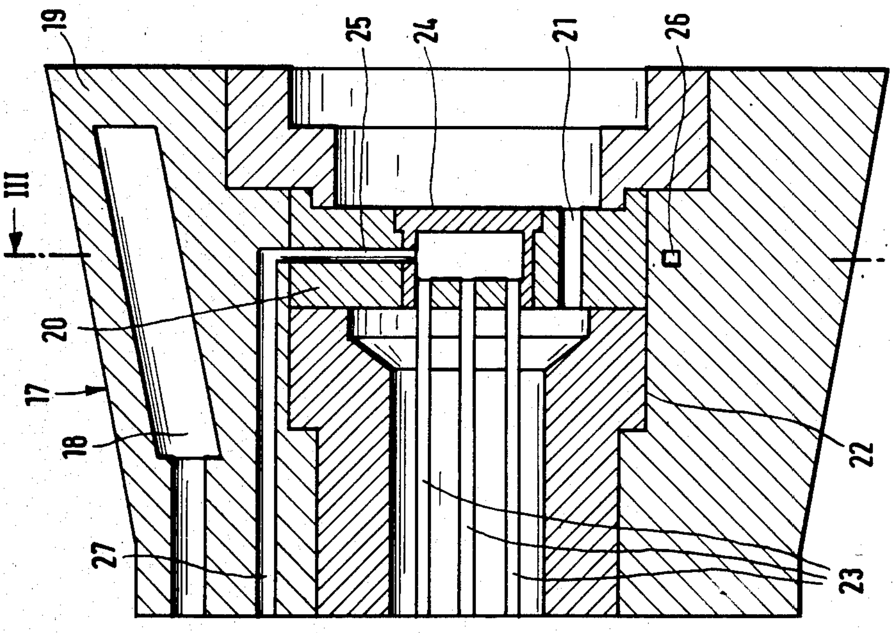
FIG. 2 a larger-scale detail section (II—II in FIG. 3) of the mould head in a modified construction which has been broken away being otherwise similar with FIG. 1.

Radial channels 25 in perforated plate 20 issue into needle holder 24. These radial channels 25 are in each case positioned between the holes 21 of perforated plate 20 and are connected to an annular duct 26 on the outer periphery of the perforated plate. Annular duct 26 is supplied by means of two axially parallel bores 27 with a fluid, preferably air or inert gas, which is under a slight overpressure. The fluid flows from the annular duct, via radial channels 25 in perforated plate 20 into the needle holder 24 and from there through the hollow needles 23 into the channels of the extruded propellant charge strand. The fluid under pressure is provided to the diametrically opposed ports 27, 27 as shown in FIG. 3, and travels through these diametrically opposed passageways to radially extending passageways 25 one of which is best shown in FIG. 2 and into a plenum chamber where the fluid then moves in the downstream direction through the hollow needles 23, 23. As shown in FIG. 3 these hollow needles are arranged inwardly of and between the circumaxially spaced openings 21, 21 to which the plasticized propellant charge is forced by the screw.

In the case of a pot press operating in batchwise manner, generally several cavities are provided with corresponding needle holders. Here again, the needles are constructed as hollow needles, to which the fluid is supplied by means of corresponding channels in the base of the press pot.

What is claimed is:

1. Apparatus for producing propellant charge powder in strand form and comprising in combination:

housing means defining an elongated chamber and having openings to receive the solid and liquid components to be mixed, screw means rotatably provided in the chamber and said screw means having helical flutes for mixing these components and feeding the mixture in a downstream direction around the central axis of the elongated chamber, a mold head at the downstream end of said casing and having a central bore defining a downstream end of said elongated chamber, said screw means having a downstream end in said mold head central bore, a perforated plate defining the downstream end of said central bore and having a plurality of circumaxially spaced openings (21, 21) therethrough, a molding chamber defined in said mold head downstream of said plate and communicating with said circumaxially spaced plate openings, said chamber having a central axis and defining the final cross sectional shape of the strand being formed, passageway means (27, 26 and 25) defined by the mold head and by said perforated plate but not in communication with said central bore or said plate openings, said plate having a central portion between said plate openings defining a plenum, and a plurality of hollow needles provided circumaxially in said molding chamber and oriented parallel to each other and to the central axis of said molding chamber, said needles having upstream ends communicating with said plenum and open downstream ends to create channels in the strand.

2. The apparatus of claim 1 further characterized by a source of fluid under pressure in excess of atmospheric, and said passageway means communicating with said pressurized fluid source.

3. The apparatus of claim 1 wherein said needles are symmetrically arranged around said central axis of said molding chamber.

4. The apparatus of claim 3 further characterized by a source of fluid under pressure in excess of atmospheric, and said passageway means communicating with said pressurized fluid source, said fluid comprising an inert gas and said pressure being approximately 1.5 atmospheres.

5. The apparatus of claim 3 wherein said hollow needles are arranged at a shorter radial distance from said central axis of said molding chamber than the radial distance of said plate openings, said plate openings also arranged symmetrically around said central axis of said molding chamber, and said openings disposed between adjacent needles to improve the channel forming action of said needles in the strand.

6. The apparatus of claim 3 further characterized by a needle located on said central axis of said molding chamber.

7. The apparatus of claim 6 wherein said plate central portion comprises a removable needle holder to facilitate replacement or repair of said needles.

* * * * *